(12) United States Patent
Jenson et al.

(10) Patent No.: US 6,236,396 B1
(45) Date of Patent: May 22, 2001

(54) METHOD AND APPARATUS FOR CONTROLLING A SCHEDULER

(75) Inventors: Scott A. Jenson, Redwood City; Lawrence G. Tesler, Portola Valley, both of CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 08/114,979

(22) Filed: Aug. 31, 1993

Related U.S. Application Data

(63) Continuation of application No. 07/889,470, filed on May 27, 1992, now abandoned.

(51) Int. Cl.[7] .................................................. G09G 5/08
(52) U.S. Cl. ............................ 345/339; 345/963; 345/358; 345/350
(58) Field of Search ............................ 345/145, 146, 345/115, 116, 157, 179, 173, 963, 349, 346, 339, 340, 351, 358, 350; 395/160, 147; 364/705.08

(56) References Cited

U.S. PATENT DOCUMENTS

| | | | | |
|---|---|---|---|---|
| 4,821,211 | * | 4/1989 | Torres ................................. | 395/160 |
| 4,899,292 | * | 2/1990 | Montagna et al. .................. | 395/147 |
| 5,050,105 | * | 9/1991 | Peters ................................. | 340/721 |
| 5,063,600 | * | 11/1991 | Norwood ............................ | 340/721 |
| 5,070,470 | * | 12/1991 | Scully et al. ....................... | 340/706 |
| 5,129,057 | * | 7/1992 | Strope et al. ....................... | 368/41 |
| 5,157,737 | * | 10/1992 | Sklarew .............................. | 382/13 |
| 5,165,012 | * | 11/1992 | Crandall et al. ................... | 395/156 |
| 5,307,086 | * | 4/1994 | Griffin et al. ...................... | 345/116 |

OTHER PUBLICATIONS

Simpson, Alan. *Mastering Wordperfect 5.1 & 5.2 For Windows*, 1992, pp. 37–38.*
"Agent DA," *MacUser* vol. 8 issue 3, Mar. 1992, p. 79.*
IBM Technical Disclosure Bulletin, vol. 26, No. 8, Jan. 1984 pp. 4380–4383 and vol. 26, No. 9, Feb. 1984, p. 4730.*
"Ascend: Windows PIM Follows Strict Time–Management Philosophy," PC Magazine, Mar. 31, 1992, p. 54.*
"How to rise to the Top in a Sea of Details," PackPat™ 4.0 for Windows, 1992, PC Magazine.*
Sharp Electronic Organizer ZQ–5000, ZQ–5200 Operation Manual, 1990, pp. 14–15, 36–61.*
O'Connor, Rory J., "Apple banking on Newton's brain, " San Jose Mercury News, Apr. 22, 1992.

* cited by examiner

*Primary Examiner*—Amelia Au
(74) *Attorney, Agent, or Firm*—Beyer & Weaver, LLP

(57) ABSTRACT

A method for controlling a scheduler on a computer display including the steps of: a) dislaying a calendar in a calendar area on the computer display; b) choosing at least one date on the calendar; and c) displaying a schedule in a schedule area on the computer display for the chosen date or dates, where both the calendar and the schedule remain active and within a single window. In one embodiments, the method is implemented on a pen-based computer system, where a stylus can choose a desired date or dates on the calendar to automatically display the schedules for that date or dates.

12 Claims, 8 Drawing Sheets

METHOD AND APPARATUS FOR CONTROLLING A SCHEDULER

CROSS REFERENCE TO RELATED APPLICATIONS

This is a continuation of application Ser. No. 07/889,470, filed on May 27, 1992, now abandoned.

BACKGROUND OF THE INVENTION

The present invention relates generally to computerized schedulers and more particularly to schedulers used on electronic personal organizers and pen-based computer systems.

Computerized personal organizers are becoming increasingly popular with a large segment of the population. These organizers tend to be small, lightweight, and relatively inexpensive, and can perform such functions as keeping a daily schedule, displaying a calendar, keeping an address and telephone book, etc. While many of these functions can also be provided conventional computer systems, personal organizers are uniquely suited to the personal organization task due to their small size and portability. Personal organizers are available from such companies as Sharp and Casio of Japan.

A relatively new form of computer, the pen-based computer system, holds forth the promise of a marriage of the power of a general purpose computer with the functionality and small size of a personal organizer. A pen-based computer system is typically a small, hand-held computer where the primary method for inputting data includes a "pen" or stylus. A pen-based computer system is commonly housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion.

One of the most frequently used functions of a personal organizer is the daily scheduler. A user typically selects a schedule date by means of a keyboard entry or other select button. With a general purpose computer, selection can be made by keyboard entry or with a pointing device such as a mouse. For example, when in a scheduling program a user can view a new date or range of dates by opening a window and entering the new date or range of dates.

A problem with schedulers of the prior art is that their user interface tends to be awkward. Personal organizers require a number of keystrokes to enter the date or range of dates to be viewed. Even computers with windowing systems tend to be awkward because they present the user with a schedule controller in one window and display the selected schedule information in another window. When in the schedule controller window, the user is locked out of the schedule display window and vice versa. Furthermore, the schedule control window is often displayed on top of the schedule display window, thereby obscuring the schedule information. This two window, modal (i.e. only one window is active at a time) system makes it difficult to easily traverse and browse through the schedule information.

Another problem with schedulers of the prior art is that the format of the displayed schedule information is somewhat limited. Most schedulers restrict the display of schedule information to one day at a time or one week at a time. It would be desirable to be able to select other display formats, such as a three day schedule or the schedule for the next four Fridays.

SUMMARY OF THE INVENTION

The present invention provides a single window, non-modal method and apparatus for controlling a scheduler. The schedule controller comprises a calendar which remains fully active with the displayed schedule information such that when a new date or range of dates is chosen on the calendar the displayed scheduler changes accordingly without further action by the user. Any set of dates which can be enclosed in a box on the calendar can be displayed in the schedule information area. Furthermore, the calendar, which is always visible, provides a user visual feed-back as to the date or range of dates displayed by the scheduler.

Briefly, the method of the present invention comprises the steps of: a) displaying a calendar in a calendar area of a computer display; b) choosing at least one date on the calendar; and c) displaying a schedule in a schedule area of said computer display for the at least one date such that both the calendar and the schedule remain active (i.e. the calendar and schedule are non-modal). Preferably, the calendar and schedule are presented in a single window or area on the computer display.

The method or process of the present invention is preferably implemented on a pen-based computer system, although it can also be used on other types of computer systems and data processing apparatus. When using a pen-based system, a stylus is used to select dates on the calendar portion of the scheduler by placing the stylus over a first date to be selected and by moving the stylus, without lifting it from the display, to a last date to be selected. The stylus is then lifted from the display to activate the selection. Selection is indicated by a rectangle drawn around the selected dates, providing visual feedback to the user as to the desired range of the displayed schedule information.

The displayed schedule information is flexible in format. Information for a single date or a range of dates can be displayed. Furthermore, the dates do not have to be contiguous. For example, the schedules for all Mondays in the month can be displayed. When M dates are selected, the schedules for the dates are displayed in side-by-side columns that are 1/M of the schedule area in width.

These and other advantages of the present invention will become apparent to those skilled in the art upon a reading of the following specification of the invention and a study of the several figures of the drawing.

BRIEF DESCRIPTION OF THE DRAWINGS

FIGS. 3b–3e are illustrations of the schedule controller (calendar) in four different selection modes;

FIGS. 5a–5d illustrate the scheduler for four different selection modes.

DETAILED DESCRIPTION OF THE PREFERRED EMBODIMENTS

Figure 1:
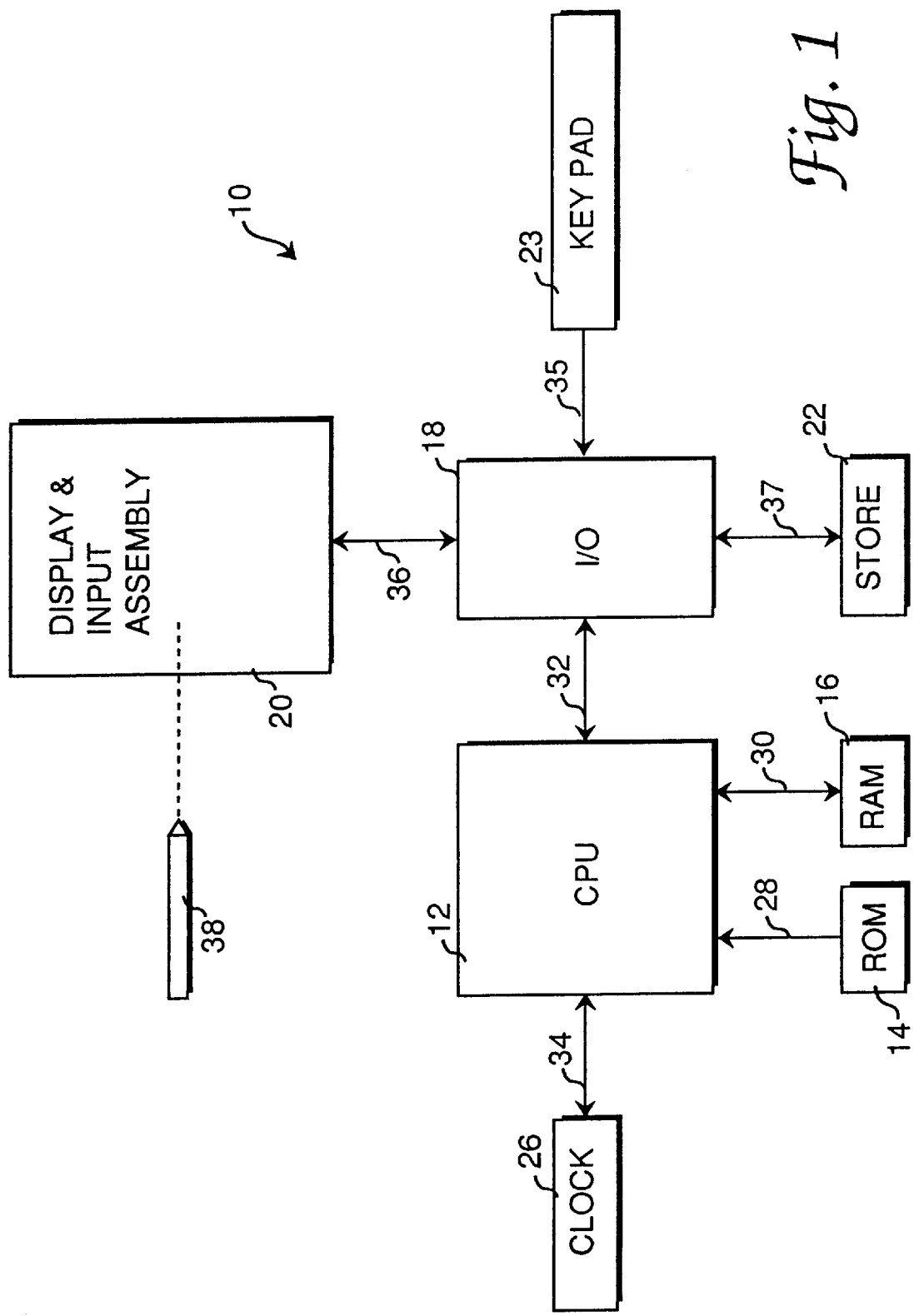
FIG. 1 is a block diagram of a pen-based computer system in accordance with the present invention.

In FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22 such as a disk drive unit or non-volatile memory such as flash memory, a keypad 23, and a clock 26.

The CPU 12 is preferably a commercially-available, single chip microprocessor. While CPU 12 can be a complex instruction set computer (CISC) chip, it is preferable that CPU 12 be a low power, reduced instruction set computer (RISC) chip which is known to be of generally higher performance than CISC chips. CPU 12 is coupled to ROM 14 by a uni-directional data bus 28. ROM 14 contains the basic operating system for the pen-based computer system 10. CPU 12 is connected to RAM 16 by a bi-directional data bus 30 to permit the use of RAM 16 as scratch pad memory. ROM 14 and RAM 16 are also coupled to CPU 12 by appropriate control and address busses, as is well known to those skilled in the art. CPU 12 is also coupled to the I/O circuitry 18 by bi-directional data bus 32 to permit data transfers with peripheral devices, and to the clock 26 by a unidirectional data line 34. Keypad 23 is coupled to I/O circuitry 18 by a uni-directional data line 35, and mass storage unit 22 is coupled to I/O circuitry by a bi-directional data line 37.

I/O circuitry 18 typically includes a number of latches, registers and direct memory access (DMA) controllers. The purpose of I/O circuitry 18 is to provide an interface between CPU 12 and such peripheral devices as display assembly 20, mass storage 22, and the array of input buttons 23.

Clock 26 provides a series of clock pulses and is typically coupled to an interrupt port of CPU 12 by the data line 34. The clock pulses are used to time various functions and events relating to the computer system 10. The clock 26 can be eliminated and the clock function replaced by a software clock running on CPU 12, but this tends to be a wasteful use of CPU processing power. In the present invention, clock 26 provides clock pulses at 60 hertz (Hz).

Display assembly 20 of pen-based computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 is preferably a liquid crystal display (LCD) of the type commercially available from a variety of manufacturers. The input device of display assembly 20 is preferably a thin, clear membrane which covers the LCD display and which is sensitive to the position of a stylus 38 on its surface. These position-sensitive membranes are also readily available on the commercial market. Combination display assemblies such as display assembly 20 which include both the LCD and the input membrane are commercially available from such vendors as Scriptel Corporation of Columbus, Ohio.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointing device", "pointing means", and the like will refer to any mechanism or device for pointing to a particular location on a screen of a computer display.

Some type of mass storage 22 is generally considered desirable. However, the mass storage 22 can be eliminated by providing a sufficient amount of RAM 16 to store user application programs and data. In that case, the RAM 16 could be provided with a back-up battery to prevent the loss of data even when the pen-based computer system 10 is turned off. However, it is generally desirable to have some type of long term storage 22 such as a commercially available miniature hard disk drive, or non-volatile memory such as flash memory or battery-backed RAM.

In operation, information is input into the pen-based computer system 10 by "writing" on the screen of display assembly 20 with the stylus 38.

Information concerning the location of the stylus 38 on the screen of the display assembly 20 is input into the CPU 12 via I/O circuitry 18. Typically, this information comprises the Cartesian (i.e. X & Y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 next produces data which is output to the display assembly 20 to produce appropriate images on its screen.

The aforementioned process produces the illusion that the stylus 38 has an "ink" which appears on the screen of the display assembly 20. Therefore, as used herein, the terms "inking" and "ink" will refer to the process and the result, respectively, of displaying a line or other indicia on the screen of display assembly 20 in response to the movement of stylus 38 on the screen.

Figure 2:
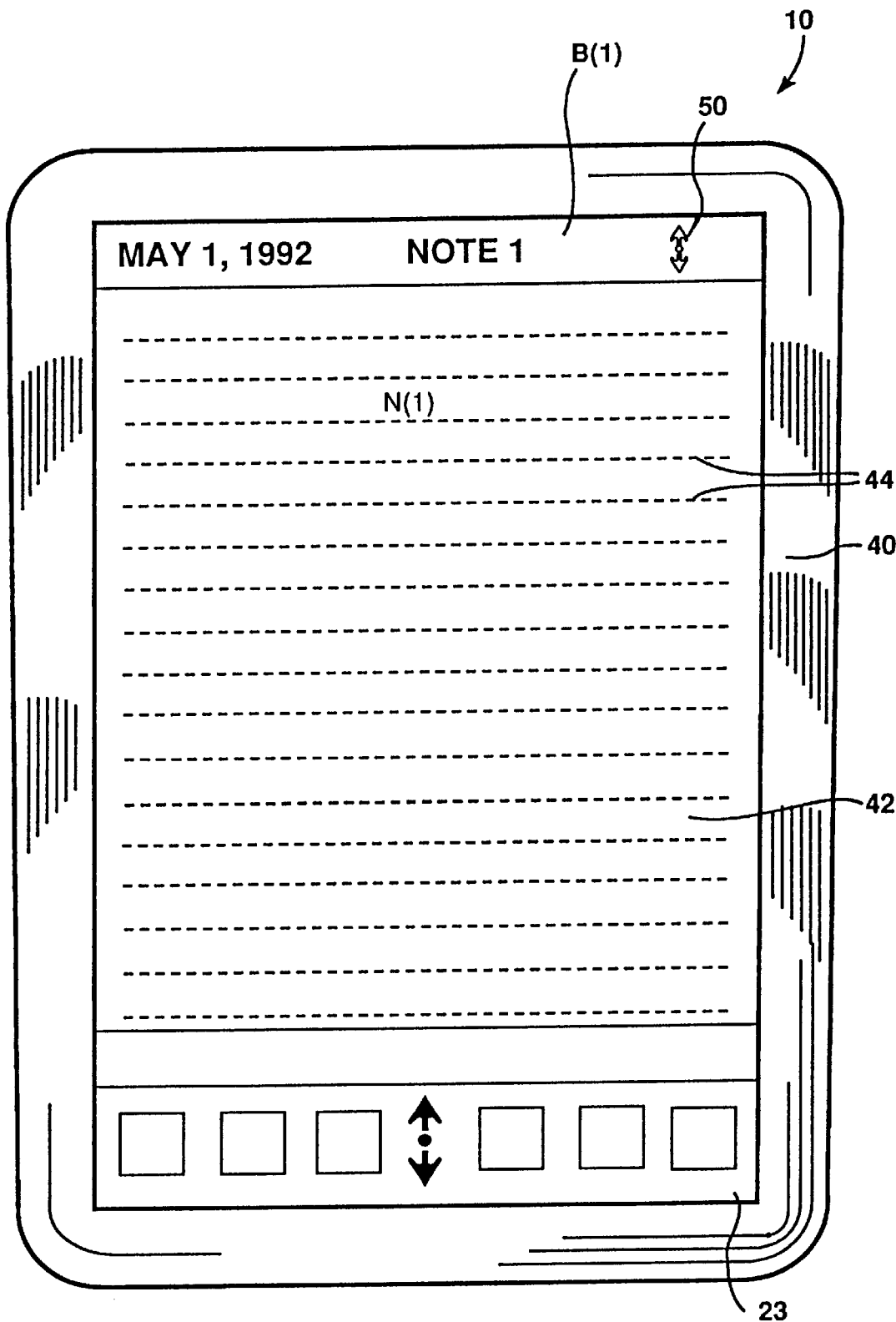
FIG. 2 is a pictorial representation of the screen of a computer display assembly of the present invention where a text object has been entered.

In FIG. 2, the pen-based computer system 10 is shown housed within a generally rectangular enclosure 40. The CPU 12, ROM 14, RAM 16, I/O circuitry 18, mass storage 22, and clock 26 are preferably enclosed within the enclosure 40. The display assembly 20 is mostly enclosed within the enclosure 40, but a viewing screen 42 of the display assembly is exposed to the user. As used herein, the term "screen" will refer to the portion of the display assembly 20 which can display an image that can be viewed by a user. Also accessible to the user is the keypad 23.

Upon power-up, pen-based computer system 10 displays an initial note area N(1) on screen 42 including a header bar B(1) and a number of guidelines 44. The optional guidelines 44 aid a user in entering text, graphics, and data into the pen-based computer system 10.

Figure 3:
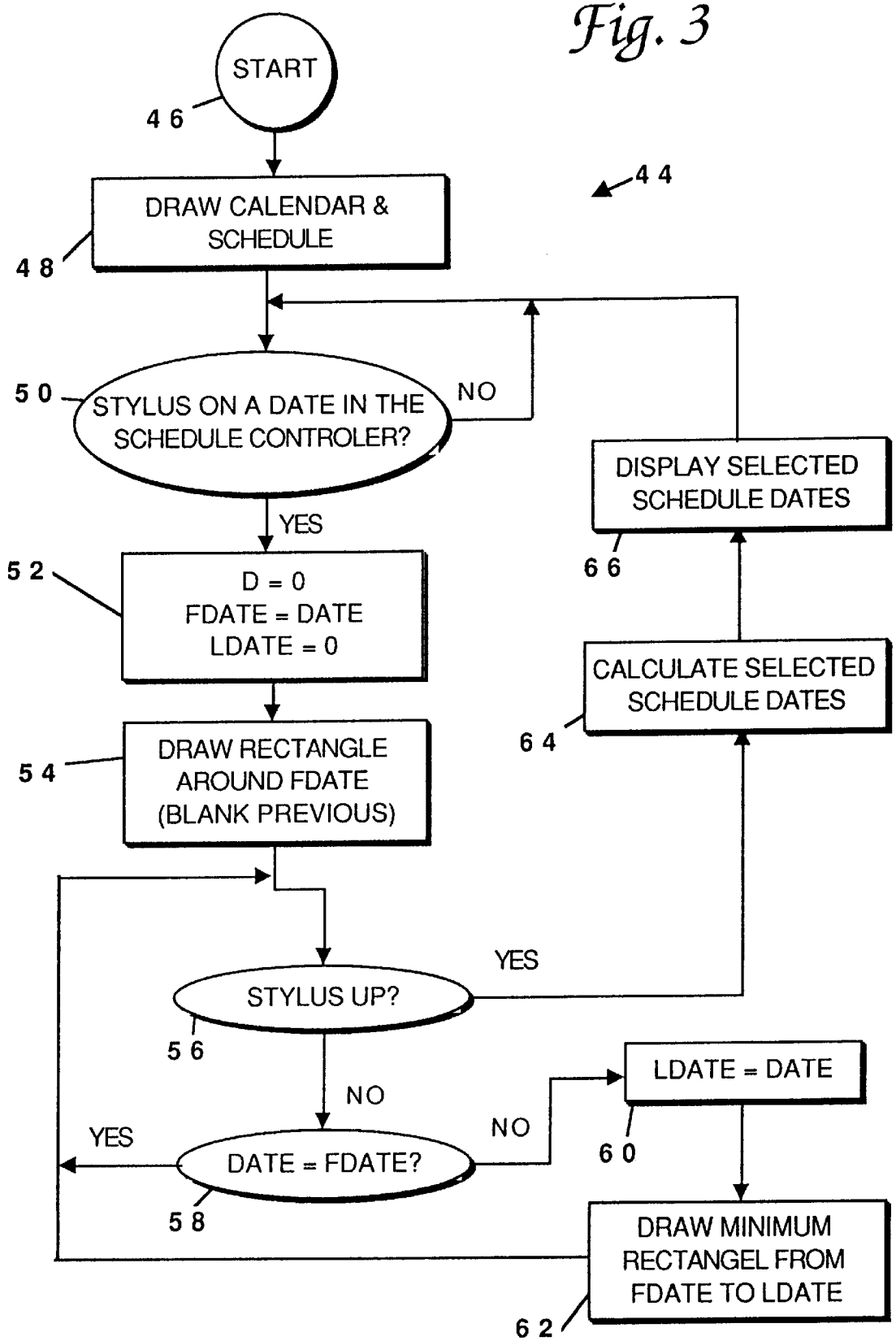
FIG. 3 is a flow diagram of a method for controlling a schedule in accordance with the present invention.
Figure 3A:
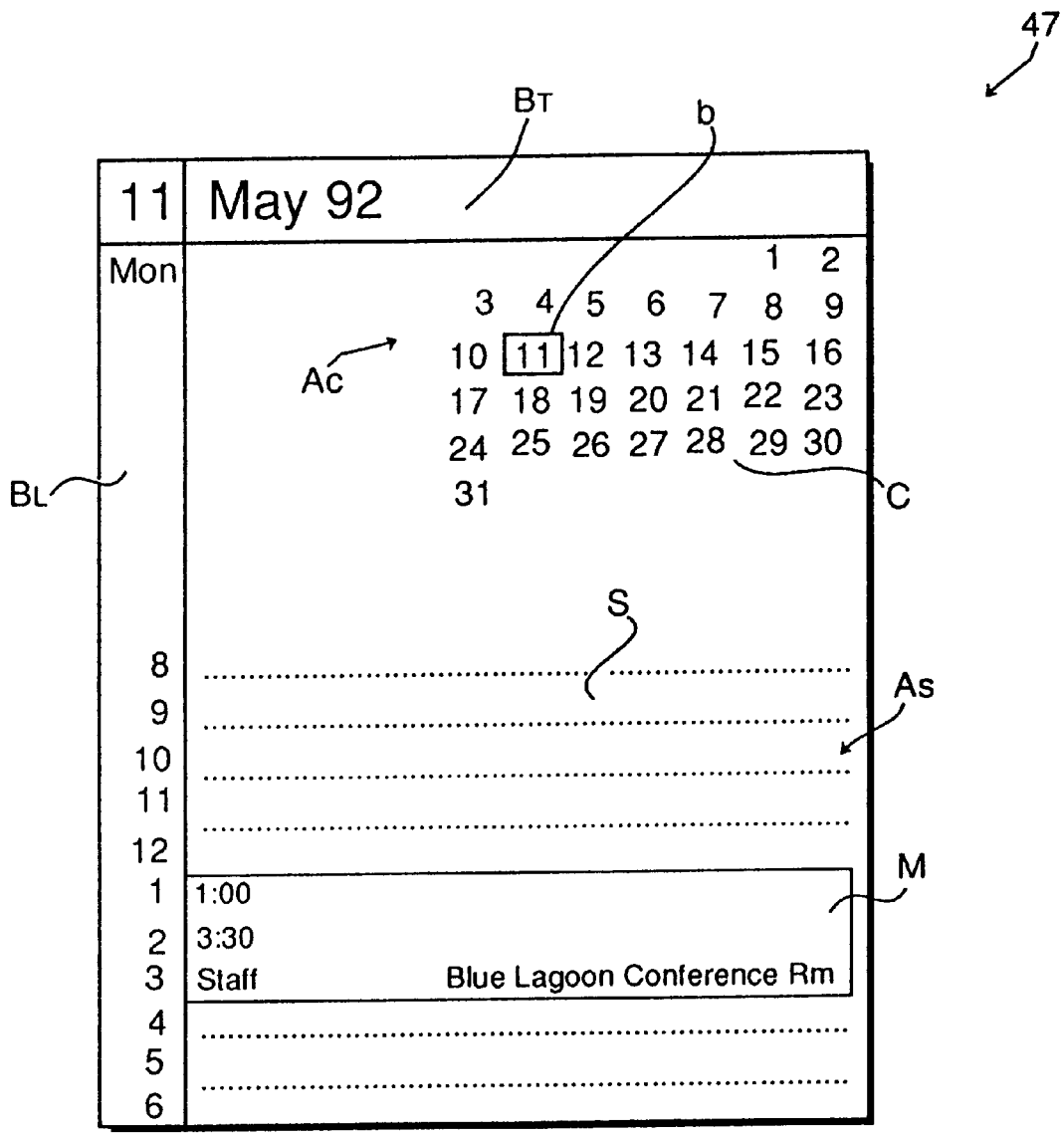
FIG. 3a is an illustration of a scheduler of the present invention as it would be viewed on the screen of FIG. 2.

FIG. 3 illustrates a method or process 44 for controlling a scheduler in accordance with the present invention. The process starts at 46, and a scheduler 47 as seen in FIG. 3a is drawn on screen 42 by a step 48. Methods for drawing to the screen of a computer system are well known to those skilled in the art. For example, the step 48 may be implemented by graphics software such as QUICKDRAW from Apple Computer, Inc. of Cupertino, Calif. A description of the QUICKDRAW graphics software is found in the book *Inside Macintosh, Volumes I, II, and III*, by C. Rose et al., Addison-Wesley Publishing Company, Inc., July 1988. With such graphics software, a line can be drawn by simply specifying the coordinates of the beginning and the end of the line, a rectangle or "box" can be placed around objects by specifying the corner points of the box, text can be drawn to the screen by specifying font, size, and location, etc.

Referring briefly to FIG. 3a, the scheduler 47 appearing on screen 42 of pen-based computer system 10 includes a top border BT and a left border BL. A selected date appears at the intersection of the top border and the left border, the day appears at the top of the left border, and the month and year appear in the top border near the date. The scheduler 47 also includes a calendar area Ac provided with a one-month calendar C and a schedule area As provided with a schedule S having a meeting box M containing the information for a meeting from 1–3 o'clock. The calendar C serves as the schedule S controller, as will be discussed in greater detail subsequently. The hours of the day are provided vertically in the left border BL, and guidelines G extend the half-hours into the schedule area As. Step 48 preferably defaults to the current date, which in this case is May 11, 1992. A box b is drawn around the default date in the calendar C. Again, the scheduler 47 and its contents can be conveniently drawn with the aforementioned QUICKDRAW graphics software.

Referring again to FIG. 3, a step 50 determines whether stylus 38 has been placed on screen 42 over one of the numbers of calendar C, i.e. of the schedule controller. If it has not been placed over a calendar date, the process continues to wait. Of course, other software processes can be running concurrently while step 50 is in a waiting mode. If the stylus does select a calendar date, an initialization step 52 sets the variable D to zero, sets the variable FDATE (first date) to the date selected by the stylus, and sets the variable LDATE (last date) to zero. In step 54, a rectangle is drawn around the date FDATE in the calendar C to indicate that the date has been selected, thereby providing visual user feedback. Also, any previous rectangles on the calendar C are removed by the step 54, preferably before the new rectangle is drawn. Next, in a step 56, the process checks to see if the stylus 56 has been removed from the screen 42. If it hasn't been removed, step 58 determines whether the date over which the stylus 38 is placed is the same as FDATE, i.e. whether the stylus has moved from FDATE to another date. If the stylus has not moved (DATE=FDATE), process control is returned to step 56. If the stylus has moved to a new date, step 60 sets the variable LDATE to the new date that the stylus is selecting. In step 62, a minimum rectangle is drawn which encloses both FDATE and LDATE to indicate the selection of a range of dates. Again, can be accomplished with QUICKDRAW by specifying the screen coordinates of FDATE and LDATE and instructing QUICKDRAW to draw a rectangle having those screen coordinates as its corners. Process control is then returned to step 56.

It should be noted that other visual user feedback of the selected dates besides a rectangle or box can be used. For example, any distinctive boundary around the dates can be used, or the dates could be "highlighted" in color or in reverse video.

When the stylus 38 is lifted from the screen 42, step 56 realizes that a date or range of dates has been selected, and a step 64 calculates the dates that the user would like to see displayed in his schedule. In step 66 the selected dates are displayed in display area As, and process control is returned to step 50.

Figures 3B, 3C, 3D, 3E:
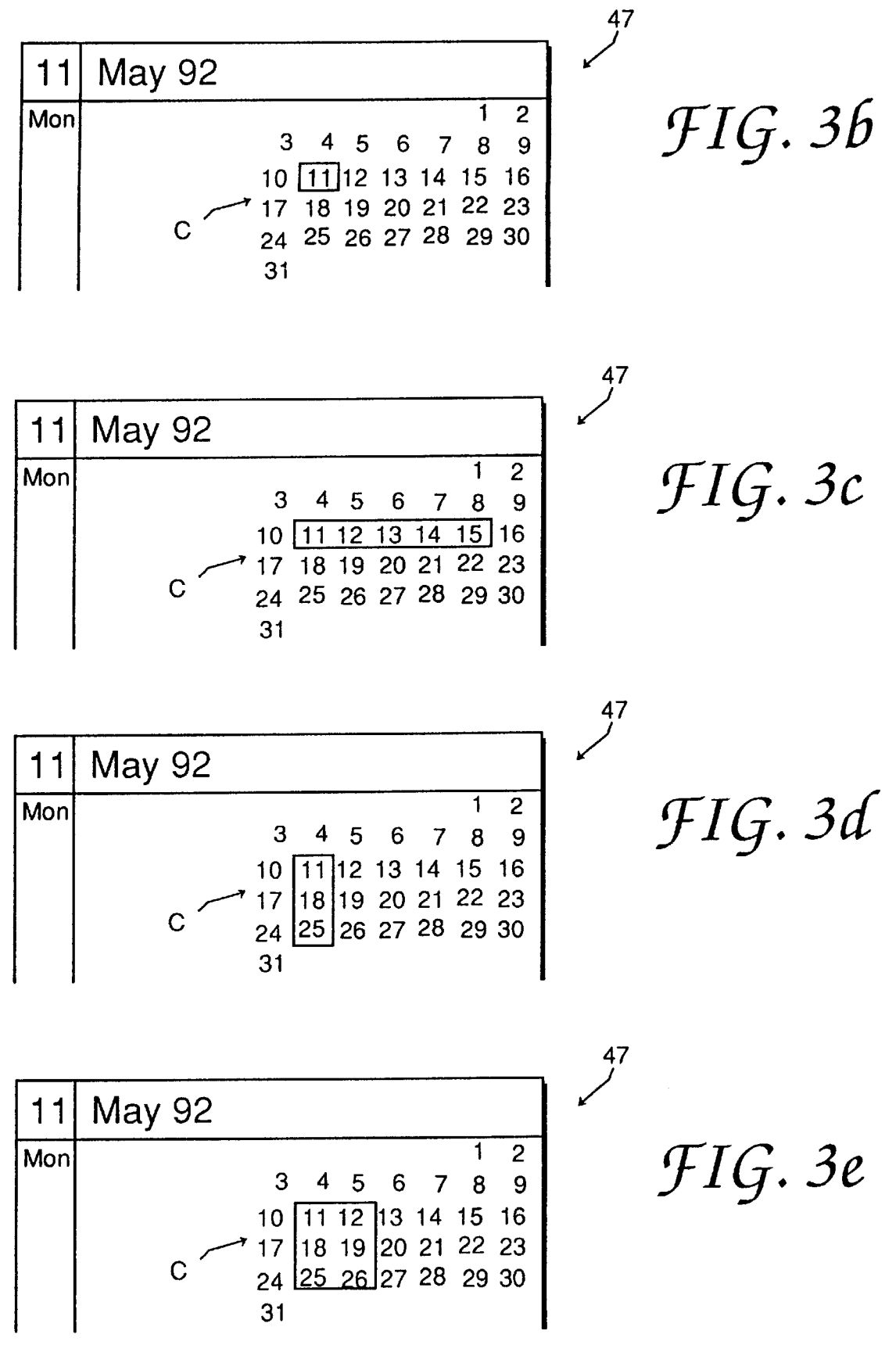

FIGS. 3b–3e illustrate a number of selections made by the schedule controller (calendar) C. In FIG. 3b a single date (i.e. May 11, 1992) has been selected as indicated by the rectangle around date 11 in calendar C. The month, day, date, and year are also displayed in the borders of the scheduler 47. In FIG. 3c, dates from May 11, 1992 to May 15, 1992 have been selected as indicated by the long, horizontal rectangle around those numbers. In FIG. 3d, the dates May 11, 18, and 25, 1992 are selected as indicated by the long, vertical rectangle around those numbers. Finally, in FIG. 3e, the dates May 11, 12, 18, 19, 25, and 26 have been selected as indicated by the squarish rectangle around those numbers. In FIGS. 3c, 3d, and 3e, information about the earliest date selected is presented in the borders.

Figure 4:
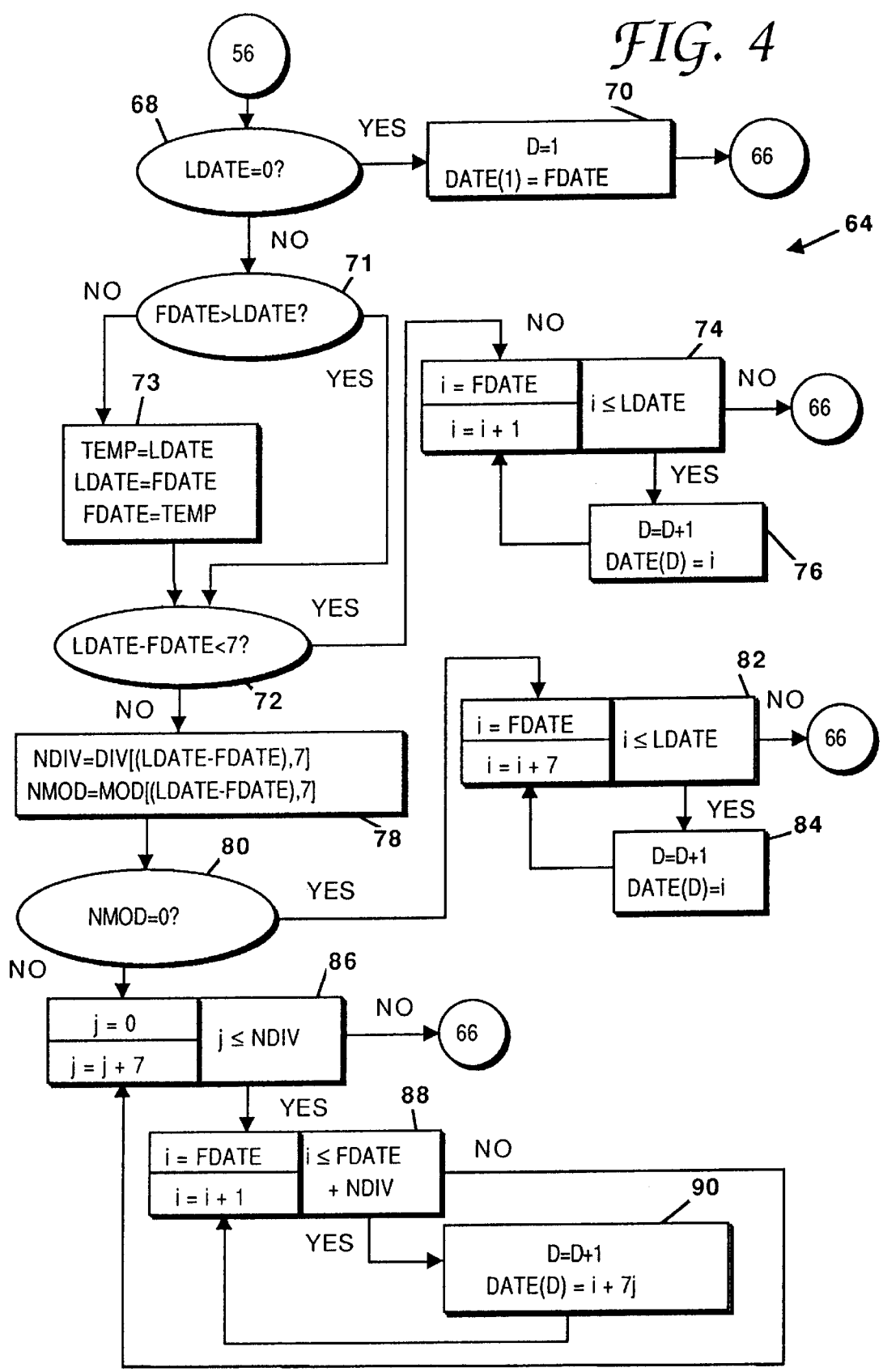
FIG. 4 is a block diagram of step 64 of FIG. 3.

Step 64 of FIG. 3 is illustrated in greater detail in FIG. 4. In a decision step 68, it is determined whether LDATE=0. If LDATE is zero, then only one date has been selected, and a step 70 sets the variable D to 1 and the DATE(1) to FDATE. The variable D holds the number of dates selected, and the array DATE(i) stores the dates that were selected. Process control is then returned to step 66.

If LDATE is not equal to zero, then more than one date has been selected on calendar C. A step 71 determines whether FDATE is greater than LDATE. If it is, the user has "forward selected" and process control is turned over to step 72. If FDATE is less than LDATE, then the user has "reverse selected", and the values of FDATE and LDATE are swapped in a step 73 before step 72 is executed. When a user forward selects, he moves the stylus to the right, or down, or both from the starting date LDATE to the final date FDATE. When a user reverse selects, he moves the stylus to the left, or up, or both from the starting date LDATE to the final date FDATE.

A step 72 determines whether all of the dates are within one week by comparing the difference between LDATE and FDATE with the length of a week, i.e. 7 days. If LDATE−FDATE<7, then all of the dates are contiguous and within one week, and a iterative loop step 74 is commenced. In step 74, a counter i is iterated by one in the range i={FDATE::LDATE}. A step 76 increments the variable D by one and the date i is assigned to the date array DATE(D) on each pass of the iterative loop step 74. Upon completion of step 74, process control is turned over to step 66.

If LDATE−FDATE is not less than seven, a date selection with a vertical component has been made. In step 78 the variables NDIV and NMOD are calculated as follows:

$$NDIV = DIV[(LDATE-FDATE), 7] \quad \text{(equation 1)}$$

$$NMOD = MOD[(LDATE-FDATE), 7] \quad \text{(equation 2)}$$

DIV is a function which returns the integer portion of a quotient of two passed values. MOD is a function which returns the integer remainder of a quotient of two passed values. For both equation 1 and equation 2, the numerator is (LDATE−FDATE) and the denominator is 7. For example, if (LDATE−FDATE)=15, then the variable NDIV is set to 2, and the variable NMOD is set to 1. NMOD is then compared to zero in a step 80. If NMOD is zero, then a vertical column of dates have been selected, an iterative loop step 82 is performed. In step 82, a counter i is iterated by 7 (the number of days in a week) in the range i={FDATE::LDATE}. On each pass through the loop, the variable D is incremented by one, and the date i is assigned to array DATE(D). Process control is returned to step 66 after the completion of the iterative loop step 82.

If step 80 determines NMOD is not zero, then more than one column of days has been selected. An iterative loop step 86 iterates a counter j by 1 in the range j={0::NDIV}. An iterative loop step 88 iterates a counter i by 1 in the range i={FDATE::FDATE+NDIV}. In a step 90, the variable D is iterated by one in each pass of iterative loop step 88, and DATE(D) is assigned the value of i+7j. Upon the completion of iterative loop step 88, process control is returned to step 86, and upon the completion of iterative loop step 86, process control is returned to step 66.

Figure 5:
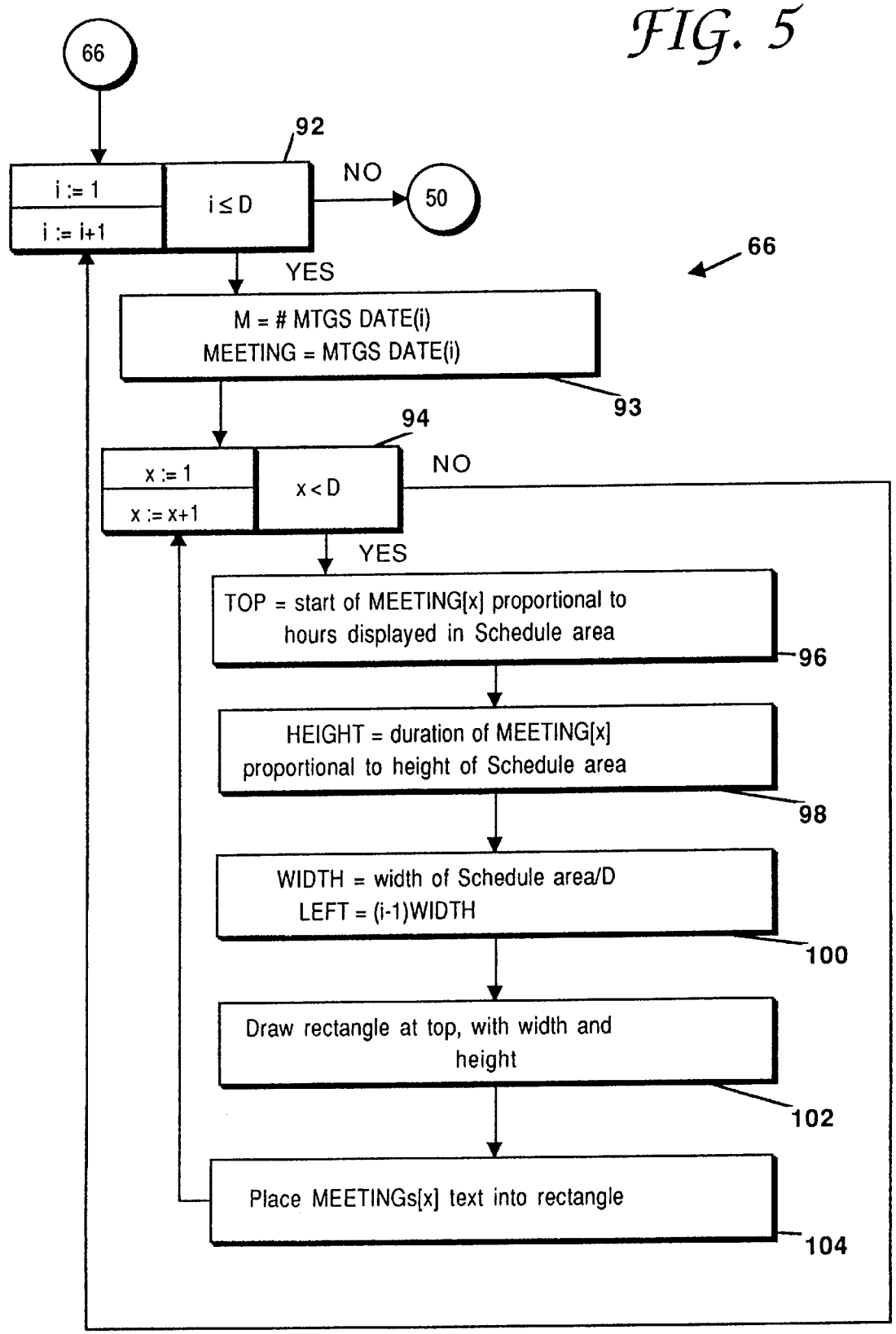
FIG. 5 is a block diagram of step 66 of FIG. 3.

Step 66 of FIG. 3 is shown in greater detail in FIG. 5. In an iterative loop step 92 a counter i is incremented by 1 in the range i={1::D}, where D is the variable passed by step 64 that contains the number of dates selected. In a step 93, the number of meetings for DATE(i) is assigned to the variable M, and the array of meetings on DATE(i) are assigned to the array MEETING. Obtaining the values for M and MEETING are simple database queries utilizing the parameter DATE(i), as is well known to those skilled in the art. Next, in an iterative loop step 94, the counter x is incremented by one in the range x={1::M}.

In the present invention, each meeting is preferably enclosed in a meeting box M which extends from the meeting start time to the meeting end time. To draw the box for a particular meeting, the variables TOP, HEIGHT, WIDTH and LEFT are calculated and then passed to QUICKDRAW as parameters.

Step 96 calculates TOP, which is the starting time of MEETING(x) in proportion to the hours displayed in the schedule area As. In the example of FIG. 3*a*, the meeting begins at 1:00 p.m. and the displayed hours are from 8 a.m. to 6 p.m. TOP is therefore started 3/5ths of the way down scheduling area As. Step 98 calculates HEIGHT, which is the time duration of MEETING(x), again in proportion to the hours displayed in the schedule area As. In a step 100, WIDTH is calculated as the width of the schedule area As divided by D, the number of dates to be displayed in the schedule area As. Step 100 also calculates the value LEFT= (I-1)WIDTH as the starting point for the left side of the box. The values of TOP, HEIGHT, WIDTH and LEFT are then passed to QUICKDRAW to draw the desired meeting box M. Finally, in a step 104, QUICKDRAW places the text for MEETING(x) in the box M. Again, this data is drawn from a database with a simple database query based upon the value of DATE(i).

After completion of step 104, process control is returned to step 94 to display all of the meetings for DATE(i). Upon completion of the iterative loop step 94 for DATE(i), process control is returned to step 92 to process the next date. After all dates in DATE(i) have been processed, process control is returned to step 50.

In FIGS. 5*a*–5*d*, a number of examples will be described to further explain the process 44 of the present invention.

EXAMPLE ONE

SELECT ONE DATE

Figures 5A, 5B, 5C, 5D:
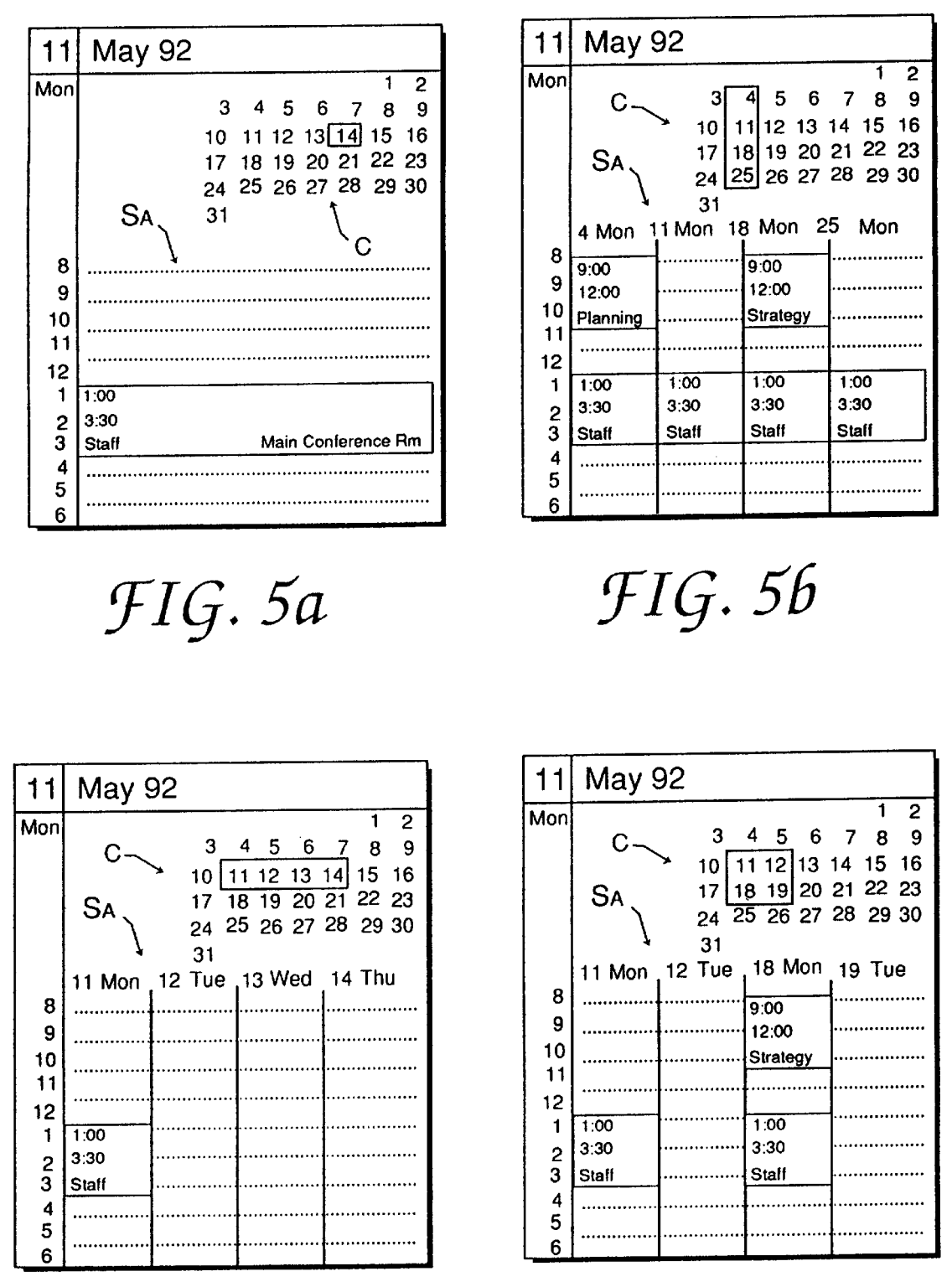

In FIG. 5*a*, the single date May 14, 1992 is selected by placing the stylus 38 over the number 14 in the calendar C and then by lifting the stylus from the screen 42. As soon as the stylus is placed over the 14, the previous selection rectangle is removed and a rectangle is drawn around the 14 by QUICKDRAW commands. Since only one date is selected, the meetings for that date fill the full width of the schedule area S.

EXAMPLE TWO

SELECT MULTIPLE DATES VERTICALLY

In FIG. 5*b*, four dates, namely May 4, 11, 18, and 25 have been selected. This is accomplished by placing the stylus over the number 4 of calendar C and moving it to the number 25 before lifting it from the screen. Again the previous rectangle is removed and a new rectangle is drawn around the selection. The meetings for the four dates are displayed side-by-side in scheduling area SA, where each date occupies ¼ of the width of the scheduling area SA.

EXAMPLE THREE

SELECT MULTIPLE DATES HORIZONTALLY

In FIG. 5*c*, four dates have been selected horizontally in a method similar to that described in example two. Again the previous rectangle is removed and a rectangle is drawn around the selection. The meetings for the four dates are again displayed side-by-side in scheduling area SA, where each date occupies ¼ of the width of the scheduling area SA.

EXAMPLE FOUR

SELECTING A BLOCK OF DATES

In FIG. 5*d*, a block of dates comprising 11, 12, 18, and 19 are selected. The previous rectangle is removed and a new rectangle is drawn around the selection. The meetings for the four dates are again displayed side-by-side in scheduling area SA, where each date occupies ¼ of the width of the scheduling area SA.

It should be noted that the selection of the dates on the calendar C is completely dynamic as long as the stylus in on the screen. For example, a user can select as shown in FIG. 5*c* by placing the stylus on the number 11 and moving it on the screen to the number 14, and then can select as shown in FIG. 5*d* by continuing to move the stylus on the screen to the number 19. The first number touched by the stylus (FDATE) will serve as a pivot point around which a great number of selections can be made by simply moving the stylus over the numbers of calendar C. The user may select by forward or backward selection, as described previously.

It should also be noted that the process 44 is both single window and non-modal, i.e. both the calendar C and the schedule S remain active at all times in a single area of the screen. Therefore, changes can be made to one without exiting the other. Also, the rectangle around the selected dates in the calendar C provide visual feedback of the dates selected for the schedule C. The selected dates share the schedule area by dividing the area into 1/D columns, where D is the number of dates selected. The schedule remains active in that it can accept edits to the displayed daily schedule or schedules, such as meeting additions, deletions, or changes.

The apparatus of the present invention is preferably based upon a pen-based computer system, although general purpose computer systems are also acceptable. The apparatus includes a computation apparatus and a display assembly coupled to the computation apparatus. The apparatus further includes a mechanism for displaying a calendar in a calendar area on the display assembly, a mechanism for choosing at least one date on the calendar, and a mechanism for displaying a schedule in a schedule area on the display assembly for the selected date or dates, where both the calendar and the schedule remain active. Preferably, the calendar area and the display area are within one window of the display assembly. The mechanism for choosing at least one date preferably includes a stylus or the equivalent. As is well known to those skilled in the art, the various apparatus and mechanisms of the present invention can be implemented in hardware, software, or both.

While this invention has been described in terms of several preferred embodiments, it is contemplated that alterations, modifications and permutations thereof will become apparent to those skilled in the art upon a reading of the specification and study of the drawings. Furthermore, certain terminology has been used for the purposes of descriptive clarity, and not to limit of the present invention. It is therefore intended that the following appended claims include all such alterations, modifications and permutations as fall within the true spirit and scope of the present invention.

What is claimed is:

1. A method for controlling a scheduler on a computer display of a pen-based computer system, the method comprising the steps of:

displaying a one-month calendar in a calendar area on the computer display of said pen-based computer system;

selecting at least one date on said calendar by engaging a stylus with said computer display over said at least one date to indicate at least one date to be displayed in a schedule;

indicating said selection of said at least one date by modifying the image of said calendar; and displaying a schedule in a schedule area on said computer display for said at least one date in response to said selecting step, wherein the schedule area does not overlap the calendar area and both said calendar and said schedule remain receptive to immediate input and are concurrently displayed on said computer display, the calendar remaining receptive to the selection of another date and the schedule being receptive to handwritten input from said stylus.

2. A method for controlling a scheduler as recited in claim 1 wherein a current date is selected as a default date upon an initial display of said calendar.

3. A method for controlling a scheduler as recited in claim 1 wherein said step of indicating said selection comprises placing a boundary image around said selection on said computer display.

4. A method for controlling a scheduler as recited in claim 3 wherein said boundary image is substantially rectangular.

5. A method for controlling a scheduler on a display assembly of a pen-based computer system comprising the steps of:

displaying a calendar in a calendar area on a display assembly of a pen-based computer system;

selecting a plurality of dates on said calendar with a stylus by placing said stylus on the display assembly over a first date and moving said stylus to a last date without removing said stylus from said display assembly;

indicating on said calendar said selection of said plurality of dates; and displaying a schedule in a schedule area on said display assembly for each of said plurality of dates in response to said selecting step, the schedule area being distinct from the calendar area; and wherein both said calendar and said schedule remain receptive to immediate input and are concurrently displayed on said display assembly, the calendar remaining receptive to the selection of another date and the schedule being receptive to handwritten input from said stylus.

6. A method for controlling a scheduler as recited in claim 5 wherein said step of indicating comprises placing a boundary image around said selection on said display assembly.

7. A method for controlling a scheduler displayed on a computer display on a pen-based computer system comprising the steps of:

displaying a one month calendar in a calendar area on a computer display of a pen-based computer system;

selecting a plurality of dates on said calendar to indicate dates to be concurrently displayed in a schedule by engaging a stylus with said computer display over said plurality of dates;

indicating said selection of said plurality of dates by modifying the image of said calendar; and concurrently displaying a plurality of daily schedules side-by-side corresponding to said selected plurality of dates in a schedule area on said computer display in response to said selecting step, such that the plurality of daily schedules are of approximately the same size and configuration, wherein both said calendar in the calendar area and said schedules in the schedule area remain receptive to immediate input, the calendar remaining receptive to the selection of another date and the schedules being receptive to handwritten input from said stylus, and said calendar and said schedules are concurrently displayed on said computer display.

8. A method as recited in claim 7 wherein the plurality of dates selected is comprised of a plurality of consecutive days.

9. A method as recited in claim 7 wherein the plurality of dates selected is comprised of a plurality of consecutive same days of the week.

10. A method as recited in claim 7 wherein the plurality of dates selected is comprised of non-consecutive days.

11. A scheduling apparatus comprising:

computation means;

display means coupled to said computation means;

means for displaying a calendar in a calendar area on said display means using a graphical user interface;

a pointer for inputting information into said computation mean;

means for choosing at least one date on said calendar using the pointer to indicate at least one date to be displayed in a schedule; and means for displaying a schedule in a schedule area for said at least one date, wherein the schedule area is distinct from the calendar area and both said calendar and said schedule remain immediately receptive to inputs and are concurrently displayed on said display means.

12. A method for controlling a scheduler on a computer display of a pointer-based computer system, the method comprising the steps of:

displaying a one-month calendar in a calendar area on the computer display of said pointer-based computer system;

selecting at least one date on said calendar by pointing over said at least one date with a pointer to indicate at least one date to be displayed in a schedule;

indicating said selection of said at least one date by modifying the image of said calendar; and displaying a schedule in a schedule area on said computer display for said at least one date in response to said selecting step, wherein both said calendar and said schedule remain receptive to immediate input and are concurrently displayed on said computer display, the calendar remaining receptive to the selection of another date and the schedule being receptive to input from said pointer.

* * * * *